(12) United States Patent
Kayyoor

(10) Patent No.: US 12,259,998 B2
(45) Date of Patent: Mar. 25, 2025

(54) DATABASE SECURITY THROUGH OBFUSCATION

(71) Applicant: ServiceNow, Inc., Santa Clara, CA (US)

(72) Inventor: Ashwin Kayyoor, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/424,218

(22) Filed: Jan. 26, 2024

(65) Prior Publication Data

US 2024/0160770 A1 May 16, 2024

Related U.S. Application Data

(63) Continuation of application No. 17/153,928, filed on Jan. 21, 2021, now Pat. No. 11,921,878.

(51) Int. Cl.
| | |
|---|---|
| *H04L 29/06* | (2006.01) |
| *G06F 16/21* | (2019.01) |
| *G06F 16/22* | (2019.01) |
| *G06F 16/242* | (2019.01) |
| *G06F 16/245* | (2019.01) |
| *G06F 21/62* | (2013.01) |

(52) U.S. Cl.
CPC ........ *G06F 21/6227* (2013.01); *G06F 16/213* (2019.01); *G06F 16/2282* (2019.01); *G06F 16/242* (2019.01); *G06F 16/245* (2019.01)

(58) Field of Classification Search
None
See application file for complete search history.

(56) References Cited

U.S. PATENT DOCUMENTS

| | | |
|---|---|---|
| 4,941,084 A | 7/1990 | Terada |
| 5,185,860 A | 2/1993 | Wu |
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |

(Continued)

*Primary Examiner* — Maung T Lwin
(74) *Attorney, Agent, or Firm* — McDonnell Boehnen Hulbert & Berghoff LLP

(57) ABSTRACT

An embodiment may involve a database including a table, wherein the table contains database records and a schema by which the database records are arranged. The embodiment may further involve one or more processors configured to: obtain a query that references the table and one or more elements of the schema; copy at least part of the table into a second table; transform, using a deterministic one-way function, the schema of the second table and the database records within the second table; transform, using the deterministic one-way function, the query into a second query; and write, to memory, at least part of the second table and the second query.

14 Claims, 12 Drawing Sheets

| | COL-1 810 | COL-2 820 | COL-3 830 | COL-4 840 |
|---|---|---|---|---|
| 850 → | F66F | 9370 | B35E | CA8F |
| 860 → | FE19 | 4571 | C709 | 5337 |
| 870 → | 991A | 82E6 | D410 | CED5 |
| 880 → | 9350 | 69B6 | C709 | 5337 |

800

(56) References Cited

U.S. PATENT DOCUMENTS

| | | |
|---|---|---|
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway et al. |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Scarpelli |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,328,260 B1 | 2/2008 | Muthiyan |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,797,342 B2* | 9/2010 | Banks ................ H04L 9/0894 |
| | | 707/999.009 |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 8,027,983 B1* | 9/2011 | Nandy ................ G06F 16/283 |
| | | 707/769 |
| 8,060,396 B1 | 11/2011 | Bessler |
| 8,196,210 B2 | 6/2012 | Sterin |
| 8,321,948 B2 | 11/2012 | Robinson |
| 8,375,224 B2* | 2/2013 | Youn ................ G06F 21/6218 |
| | | 713/193 |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,626,749 B1* | 1/2014 | Trepetin ............ G06F 21/6254 |
| | | 707/722 |
| 8,646,093 B2 | 2/2014 | Myers |
| 8,674,992 B2 | 3/2014 | Poston |
| 8,725,647 B2 | 5/2014 | Disciascio |
| 8,755,522 B2* | 6/2014 | Stella ................ G06F 21/577 |
| | | 380/278 |
| 9,053,460 B2 | 6/2015 | Gilbert |
| 9,069,737 B1 | 6/2015 | Kimotho |
| 9,098,555 B2 | 8/2015 | Bjork |
| 9,971,826 B1 | 5/2018 | Belmar |
| 10,079,730 B2 | 9/2018 | Subramanian |
| 10,503,727 B2 | 12/2019 | Laethem |
| 10,673,963 B1 | 6/2020 | Feiguine |
| 10,691,754 B1* | 6/2020 | El Defrawy ........ H04L 63/0428 |
| 10,740,474 B1* | 8/2020 | Ghetti ................ H04L 9/3066 |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,999,152 B1 | 5/2021 | Bar Oz |
| 11,025,481 B1 | 6/2021 | Louca |
| 11,089,115 B2 | 8/2021 | Garty |
| 11,095,506 B1 | 8/2021 | Erblat |
| 11,275,580 B2 | 3/2022 | Tamir |
| 11,277,475 B1 | 3/2022 | Tal |
| 11,281,442 B1 | 3/2022 | Tal |
| 11,294,666 B1 | 4/2022 | Look |
| 11,296,922 B2 | 4/2022 | Leibkowiz |
| 11,301,503 B2 | 4/2022 | Burli |
| 11,379,089 B2 | 7/2022 | Goswami |
| 11,392,714 B1* | 7/2022 | Matthews ............ H04L 9/0894 |
| 11,451,573 B2 | 9/2022 | Waplington |
| 11,470,107 B2 | 10/2022 | Waplington |
| 11,582,106 B2 | 2/2023 | Hameiri |
| 11,616,690 B2 | 3/2023 | Feiguine |
| 11,630,717 B2 | 4/2023 | Vutukuru |
| 11,632,303 B2 | 4/2023 | Bitterfeld |
| 11,640,369 B2 | 5/2023 | Bhogle |
| 11,671,444 B2 | 6/2023 | Waplington |
| 11,695,641 B2 | 7/2023 | Bar Oz |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |
| 2006/0026453 A1 | 2/2006 | Frost |
| 2006/0095461 A1 | 5/2006 | Raymond |
| 2006/0179058 A1 | 8/2006 | Bram |
| 2006/0288053 A1 | 12/2006 | Holt |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0228984 A1 | 9/2009 | Sterin |
| 2010/0110932 A1 | 5/2010 | Doran |
| 2012/0016706 A1 | 1/2012 | Pargaonkar |
| 2013/0283273 A1 | 10/2013 | Miyazaki |
| 2014/0122427 A1 | 5/2014 | Dary |
| 2014/0281512 A1* | 9/2014 | Arasu ................ G06F 21/602 |
| | | 713/165 |
| 2015/0039885 A1* | 2/2015 | Cash ................ H04L 9/0894 |
| | | 713/165 |
| 2018/0123940 A1 | 5/2018 | Rimar |
| 2019/0073257 A1 | 3/2019 | Dasgupta |
| 2019/0104398 A1 | 4/2019 | Owen |

(56) References Cited

U.S. PATENT DOCUMENTS

| | | |
|---|---|---|
| 2019/0129739 A1 | 5/2019 | Al Reza |
| 2019/0149515 A1 | 5/2019 | Sharma |
| 2019/0165957 A1 | 5/2019 | Abbott |
| 2019/0342162 A1 | 11/2019 | Bendre |
| 2020/0034365 A1 | 1/2020 | Martin |
| 2020/0034462 A1 | 1/2020 | Narayanasamy |
| 2020/0050689 A1 | 2/2020 | Tal |
| 2020/0074107 A1 | 3/2020 | Barbas |
| 2020/0204443 A1 | 6/2020 | Bar Oz |
| 2020/0301678 A1 | 9/2020 | Burman |
| 2020/0372031 A1* | 11/2020 | Ruehle .................. G16B 30/20 |
| 2021/0097168 A1 | 4/2021 | Patel |
| 2021/0194764 A1 | 6/2021 | Badyan |
| 2022/0303352 A1 | 9/2022 | Herzog |
| 2023/0229542 A1 | 7/2023 | Watkins |

* cited by examiner

| | |
|---|---|
| CHRIS A. | 9370 |
| NAME | COL-2 |
| JOE B. | 4571 |
| CHRIS B. | 82E6 |
| DON T. | 69B6 |
| SALARY | COL-3 |
| 1000 | B35E |
| 1500 | C709 |
| 1700 | D410 |
| ADDRESS | COL-4 |
| 123 SECOND ST, SANTA CLARA, CA | CA8F |
| 165 PARK ST, SANTA CLARA, CA | 5337 |
| MOUNTAIN VIEW, CA | CED5 |
| ID | COL |
| 1 | F66F |
| 2 | FE19 |
| 3 | 991A |
| 4 | 9350 |
| EMPLOYEE | B98C |

FIG 7

DATABASE SECURITY THROUGH OBFUSCATION

CROSS-REFERENCE TO RELATED APPLICATION

This application is a continuation of and claims priority to U.S. patent application Ser. No. 17/153,928, filed Jan. 21, 2021, which is hereby incorporated by reference in its entirety.

BACKGROUND

With advances in technology and the rise of cloud computing solutions, databases are becoming larger, more complex, and more important. It is now common for commercial database systems to support gigabytes or even terabytes of storage for enterprises or individual users. With this volume of data and its importance, it is desirable to be able to rapidly debug and resolve errors and/or performance-related problems in databases. However, like many software systems, it may be not practical or even possible to reproduce such an issue without an accurate and representative set of data that is likely to have caused the issue in the first place. Since databases may contain various types of confidential information, such as personally identifying information (PII) of individuals, trade secrets, and/or source code of computer programs, it may not be appropriate or legal to share such data in its original form with a party that is not authorized to view such data (e.g., a database vendor or consultant). As a consequence, database issues often remain unresolved for long periods of time, reducing their overall efficacy.

SUMMARY

The embodiments herein overcome these and potentially other issues by facilitating the obfuscation of data in databases. While naïve obfuscation could be used to effectively randomize database content while maintaining the secrecy of confidential information, doing so destroys the original distribution of the data therein, as well as relationships between this data. Thus, naïve obfuscation is unlikely to help debug database issues that are difficult to reproduce.

Accordingly, these embodiments employ a deterministic one-way function or similar mechanism to a query and set of original data within the database. The result is an obfuscated version of the query and the original data that preserves the relationships between elements in the original data, the relationships between information in the query and the original data, and the distribution of values in the original data. This obfuscated version also maintains the secrecy of confidential information, and can also be used to debug database issues with a much higher likelihood of success.

Notably, the function can transform the original data (e.g., from original alphanumeric text to obfuscated alphanumeric text) in database records, database schemas, and queries in a consistent fashion. As a result, the tables and columns in the database that were referenced by a query are mapped to corresponding structures in the obfuscated version.

Thus, when a query of the original data results in a database error or performance-related problem, the tables referenced by the query can be extracted from the query. Some or all of these tables may be copied and then obfuscated. The same obfuscation function may be used to obfuscate the tables' schemas (e.g., table names and column names) and the query as well. Then, the obfuscated version of this data can be safely provided to another party (e.g., the database developer), even if the original data contained confidential information. That party can use the obfuscated data to debug the issue without being able to derive the confidential information. Experiments have shown that this approach resolves lingering issues that otherwise might have never been properly addressed.

Accordingly, a first example embodiment may involve a database including a table, wherein the table contains database records and a schema by which the database records are arranged. The first example embodiment may further involve one or more processors configured to: obtain a query that references the table and one or more elements of the schema; copy at least part of the table into a second table; transform, using a deterministic one-way function, the schema of the second table and the database records within the second table; transform, using the deterministic one-way function, the query into a second query; and write, to memory, at least part of the second table and the second query.

A second example embodiment may involve obtaining a query that references a table and one or more elements of a schema, wherein a database includes the table, and wherein the table contains database records and the schema by which the database records are arranged. The second example embodiment may also involve copying at least part of the table into a second table. The second example embodiment may additionally involve transforming, using a deterministic one-way function, the schema of the second table and the database records within the second table. The second example embodiment may further involve transforming, using the deterministic one-way function, the query into a second query. The second example embodiment may also involve writing, to memory, at least part of the second table and the second query.

In a third example embodiment, an article of manufacture may include a non-transitory computer-readable medium, having stored thereon program instructions that, upon execution by a computing system, cause the computing system to perform operations in accordance with the first example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment.

In a fifth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts a mappings table, in accordance with example embodiments.

DETAILED DESCRIPTION

Figure 1:
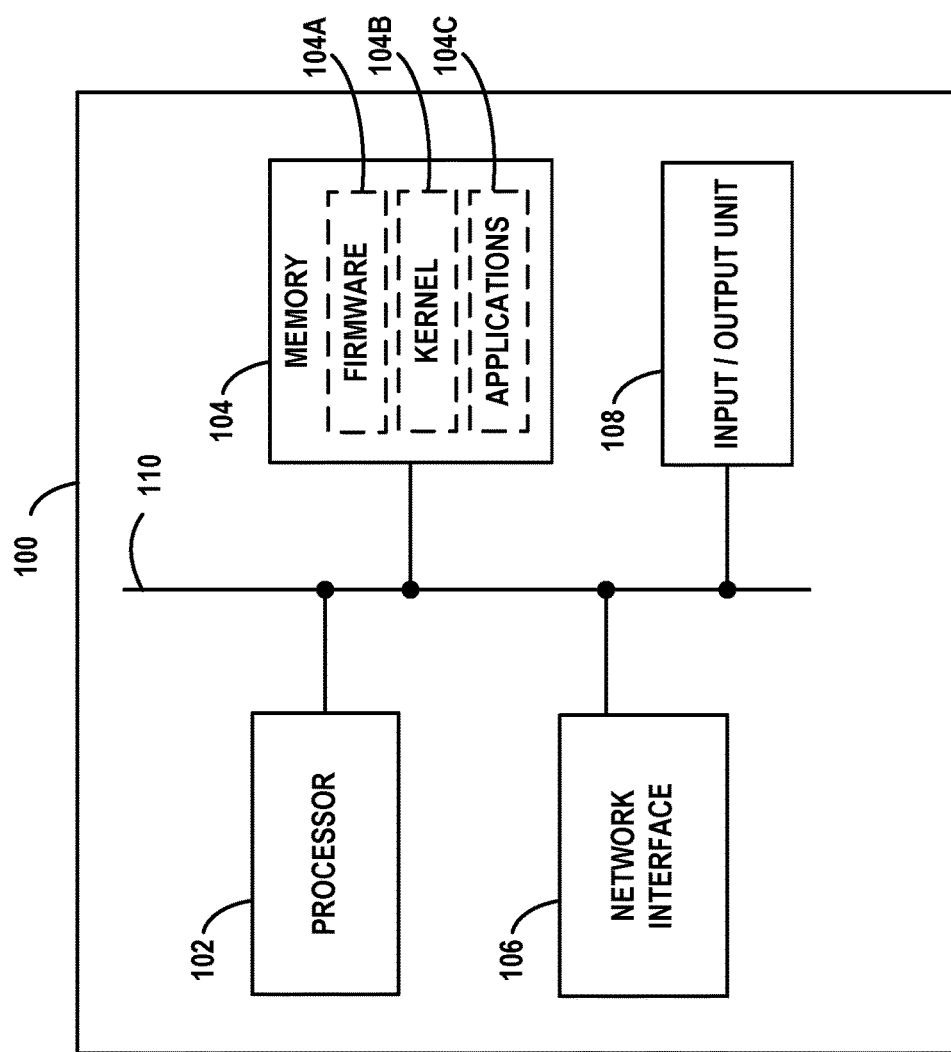
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
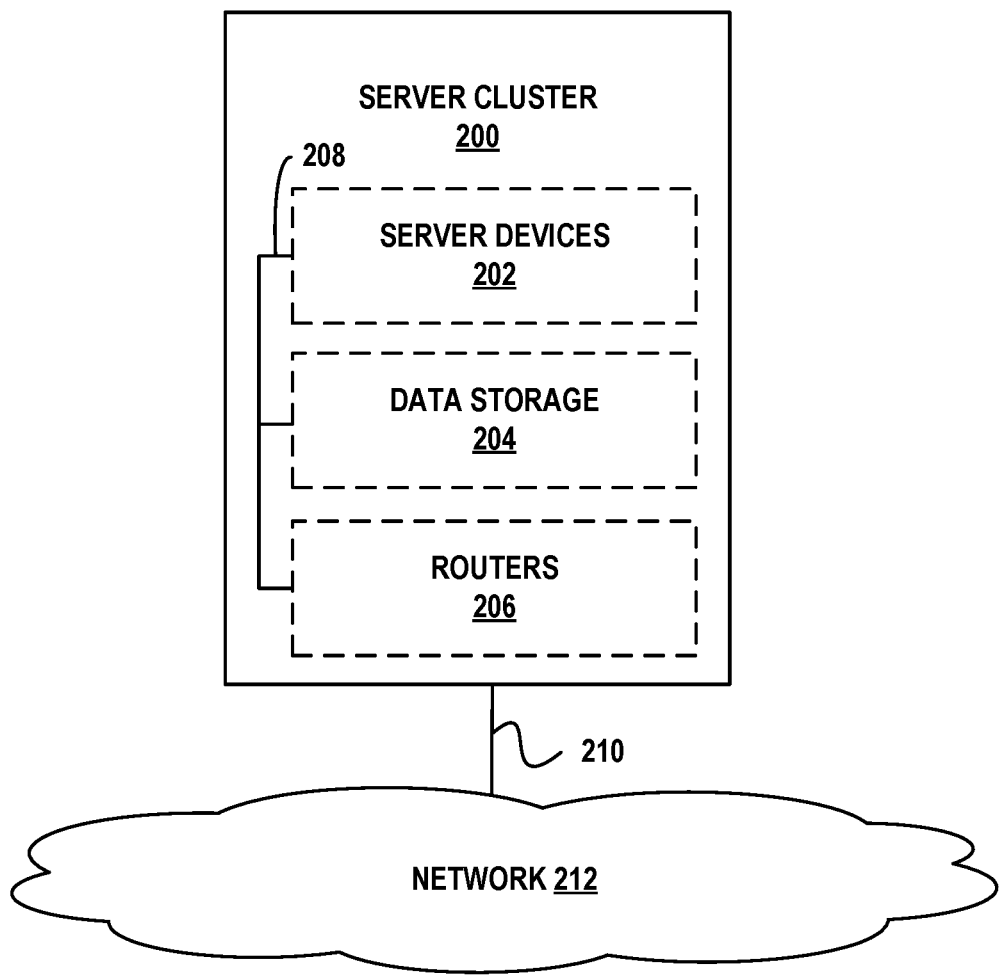
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may al so be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
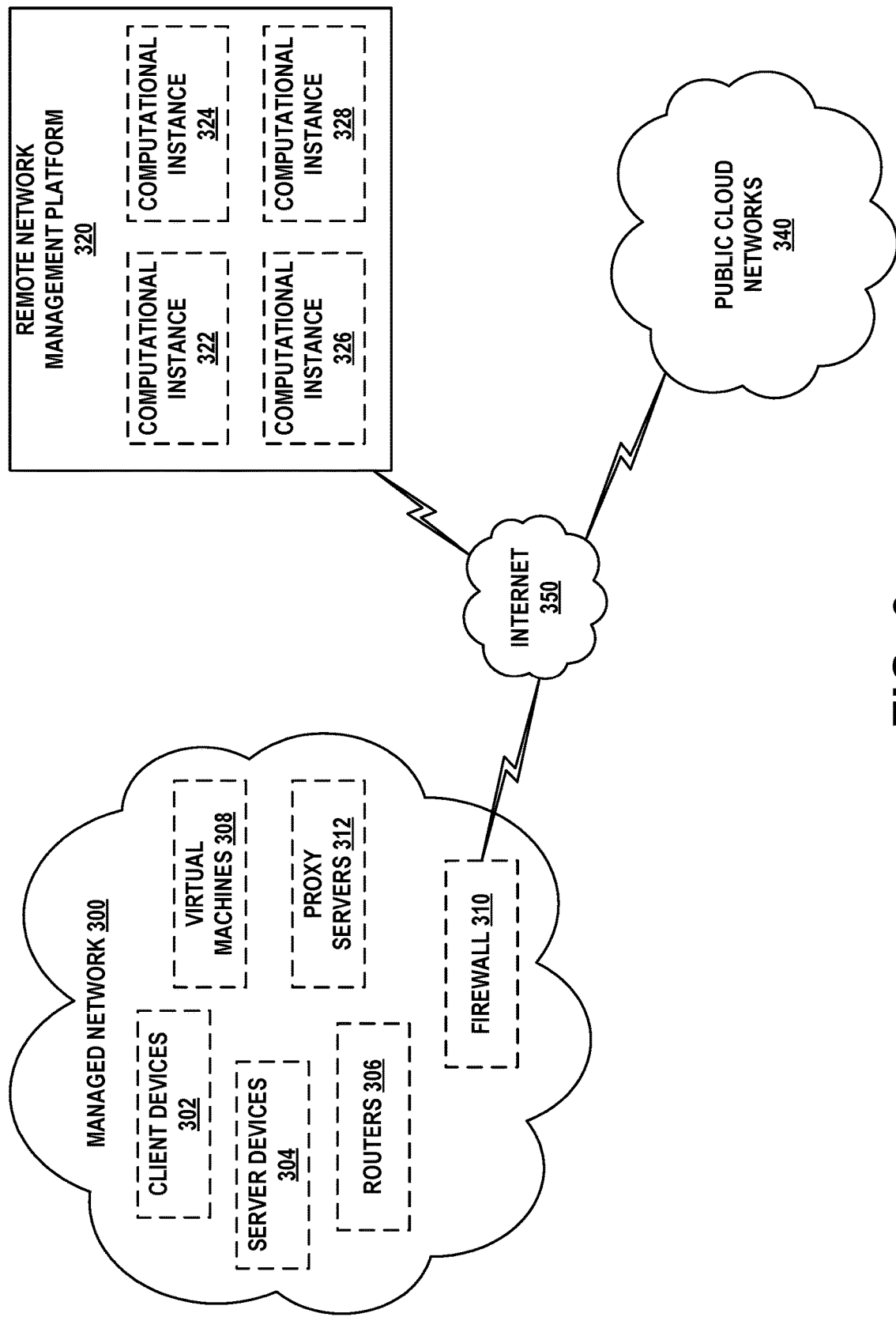
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
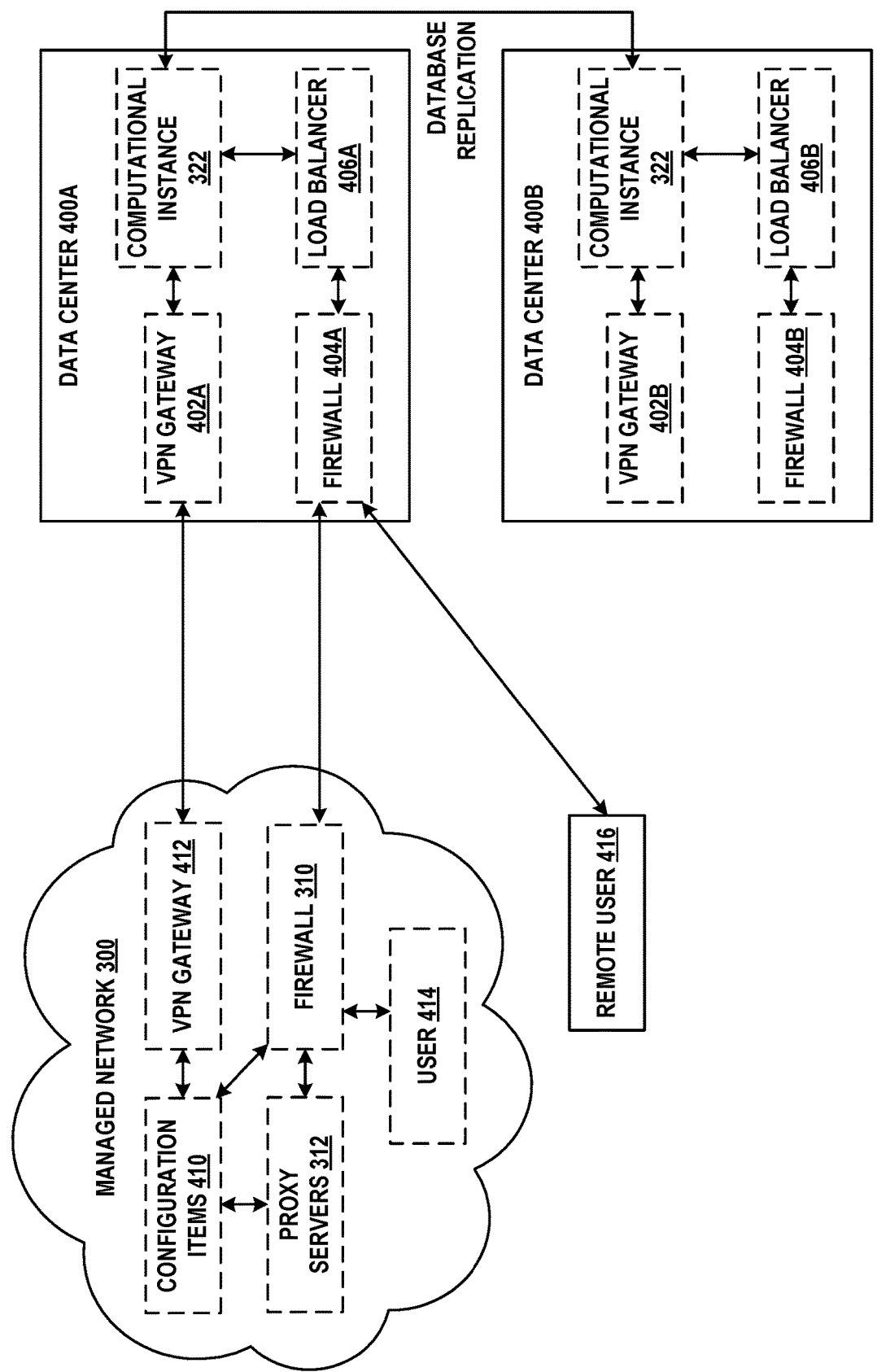
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
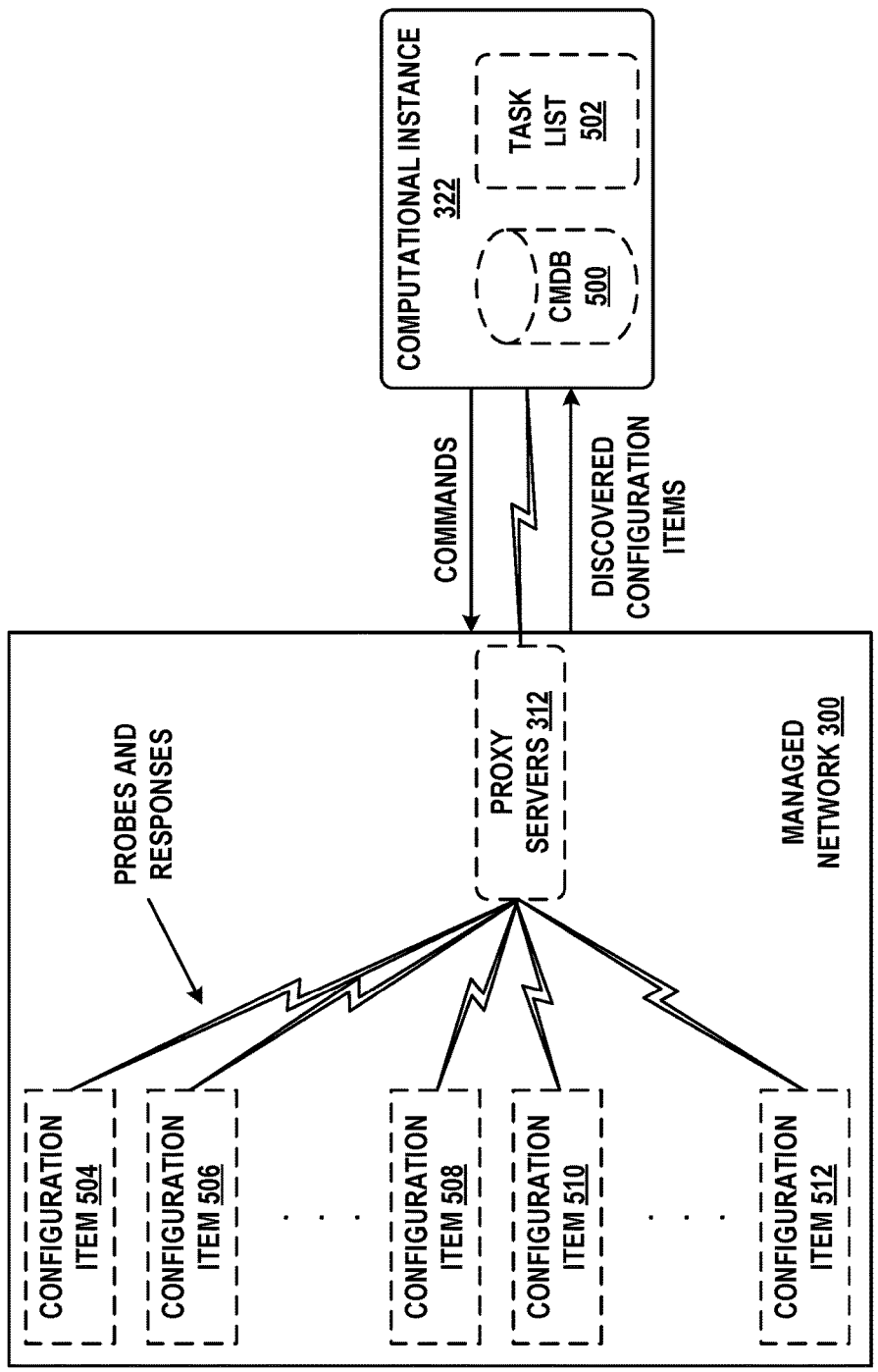
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
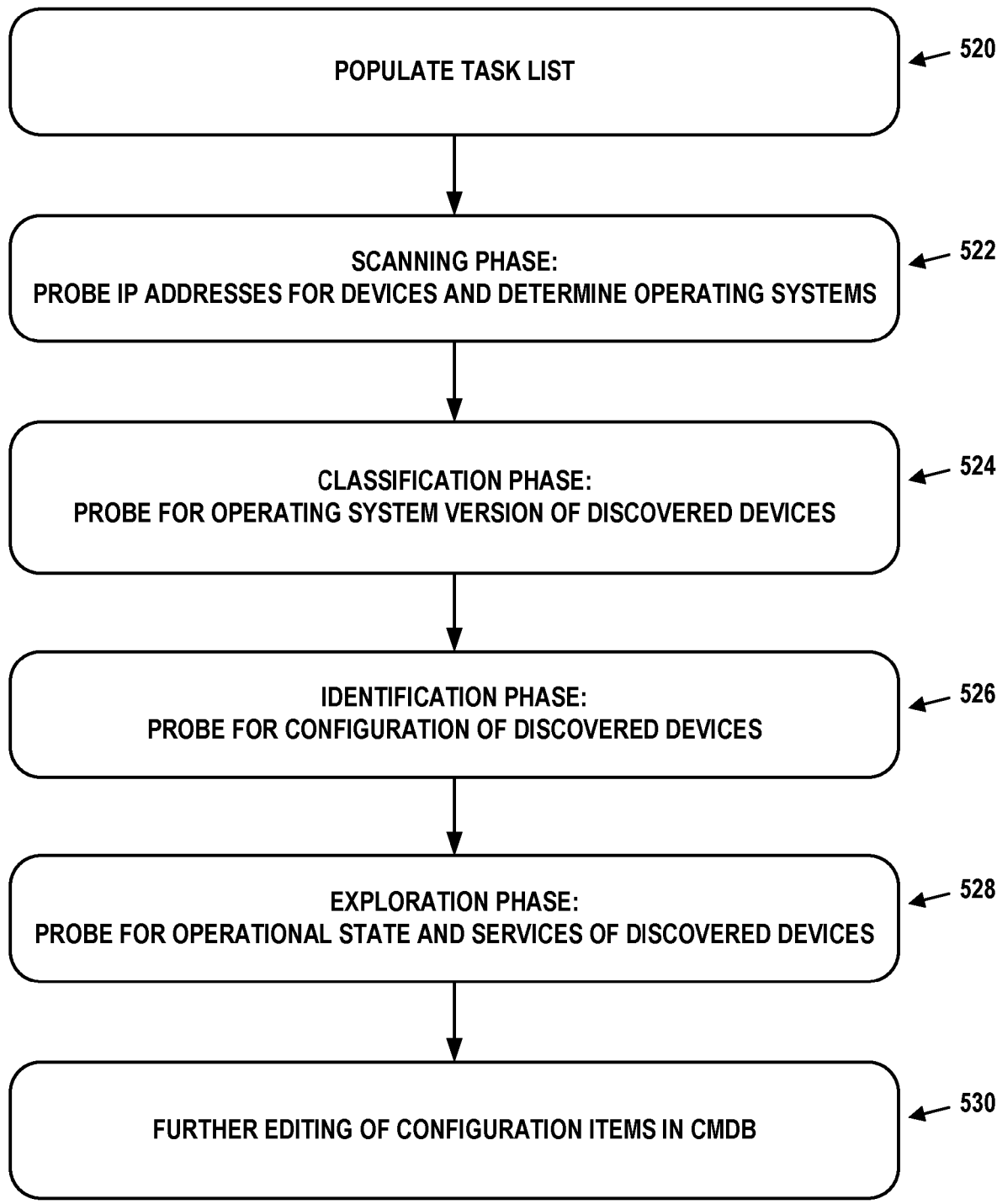
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Obfuscation Mechanisms

In some examples, a query to a database, e.g., CMDB 500, may result in a database error or performance-related problem. The embodiments herein may be used to facilitate obfuscation of queries, database records and schema such that they may be safely provided to a third party, even if the original, unobfuscated data contained confidential information. The third party can then use the obfuscated data to debug the issue without being able to view or determine the original, unobfuscated data.

A. Example Table and Database Entries

Figure 6:
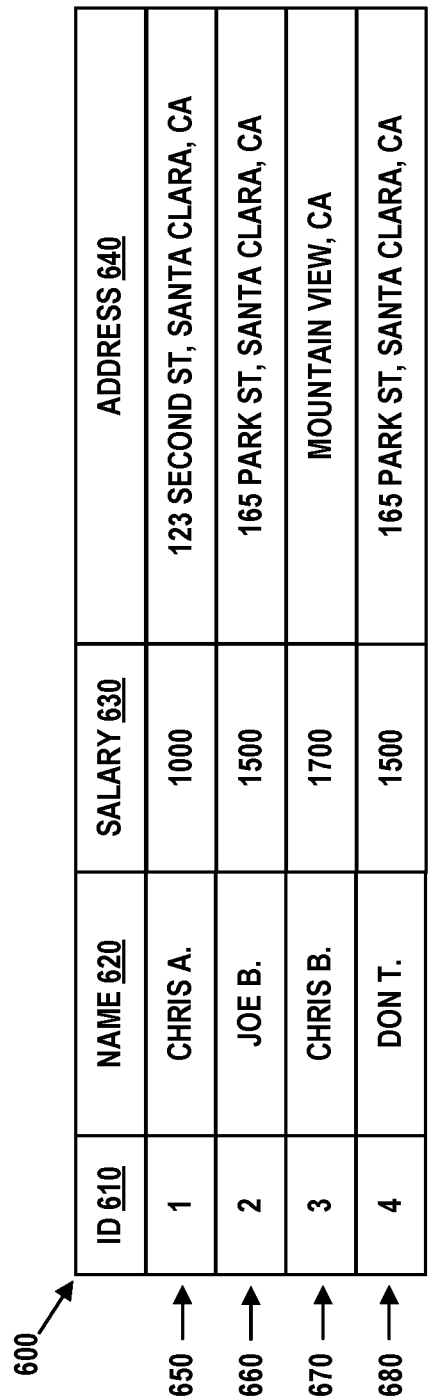
FIG. 6 depicts a table, in accordance with example embodiments.

FIG. 6 depicts example unobfuscated table 600 which could be disposed within a previously mentioned database (e.g., CMDB 500 or another database). The database could contain many tables (including table 600, for example), and the structure of the database and individual tables within the database could be stored in a schema.

The schema could include the database name, table names, table column names, table row count, table create time, table check time, table row formats, table version, among other information. For example, the portion of the schema relating to table 600 (otherwise referred to as the schema of table 600) could indicate that the database contains table 600 and table 600 includes four columns. The schema could further indicate that the column names of table 600 include "ID" as in column 610, "name" as in column 620, "salary" as in column 630, and "address" as in column 640. In various examples, "ID" could be a table-wise unique identifier, "name" could be a name of an individual, "salary" could be an individual's weekly compensation, and "address" could be an individual's postal address. Other possibilities exist.

Separate from the schema, but related thereto, could be database records that appear in rows of table 600. From these database, it could be deduced that entries in row 650 are associated with "Chris A." who has an associated ID of "1", a salary of "1000", and an address of "123 Second St, Santa Clara, CA". Similarly, it could be deduced that the entries in row 660 are associated with "Joe B." who has an associated ID of "2", a salary of "1500", and an address of "165 Park St, Santa Clara, CA". Rows 670 and 680 contain similar types of data.

One of the insights that led to these embodiments is the vast majority of confidential information in a database is stored in alphanumeric strings (e.g., text strings). Such alphanumeric strings typically make up the query, the schema, and most of the database record material. Thus, if these strings can be obfuscated, the problem of sharing this information with a third party is largely solved.

The databases described in these examples may be relational databases. Nonetheless, the embodiments herein may be applied to non-relational databases as well.

B. Example Obfuscation Functions

To obfuscate the database records in table 600 and schema of table 600, a computing device may use a deterministic one-way function that produces one-to-one mappings between original entries and obfuscated entries. Specifically, a one-way function $f$ is defined so that $y=f(x)$ is relatively easy to compute for any x (e.g., possibly in linear or polynomial time), and the resulting value of y is the same for each time $f$ is applied to a particular input x. Thus, the function is deterministic in the sense that it the same input results in the same output. But, given y, an adversary would find it computationally intractable (e.g., requiring exponential time if possible at all) to determine x. Examples of deterministic one-way functions include various types of hash functions and digital signatures.

A specific example of a deterministic one-way function is in the Python UUID library module. This module can generate deterministic obfuscated output based on a string of input bytes in accordance with Internet Engineering Task Force Request for Comments (RFC) 4122. Using UUID version 3 or version 5 techniques, each time the library function is called with the same namespace and the same input string, the same obfuscated output string is produced.

The embodiments herein contemplate, but do not require, session-level determinism where a one-way function $f$ could be seeded with a possibly random value for some period of time during an obfuscation session. Here, an obfuscation session might include obfuscation of a given query, one or more database tables referenced therein and the schema of these tables. As an example, a first obfuscation session might use a seed s1 while a second obfuscation session might use a seed s2. The second obfuscation session might take place at any point after the first obfuscation session. The output of $f$ for the same input x would be different for each obfuscation session. In other words, $y1=f(x, s1)$ and $y2=f(x, s2)$, where $y1 \neq y2$. A seed may be applied by concatenating it with the input x in some fashion, or by applying an XOR function to the bits of the seed and x. Alternatively, for a UUID version 3 or version 5 generator, the seed may be defined as the namespace input to the function. Thus, even if the adversary is somehow able to determine y1 from x, that knowledge would provide little or no advantage for determining that y2 also represents x.

In further examples, the seed value could expire after a certain time and the computing device may generate a replacement to be used as input into the one-way deterministic function. With a periodically changing seed value, it would be difficult for an adversary to determine the content of the obfuscated data even when the one-way deterministic function is used for an extended amount of time across different tables and/or databases. Particularly, this allows the number of obfuscations per seed to be limited, making probabilistic analyses (e.g., frequency analyses) of obfuscated data less likely to result in the original data.

Nonetheless, the embodiments herein are not limited to these techniques, and thus support different types of deterministic one-way functions may have various levels of privacy.

C. Example Mappings

With a deterministic one-way function, data may be mapped to obfuscated values. This function may be performed on a token by token basis for the query, schema, and database records. For example, each of the query, schema, and database records may be tokenized into a respective set of alphanumeric strings that that are separated by whitespace, for example. Then, each token may be obfuscated by separately applying the deterministic one-way function to it. For example, the SQL query "select name from employee" may be tokenized into the alphanumeric strings "select", "name", "from", and "employee", and then the deterministic one-way function may be applied to each of these strings. A similar process may take place for the schema and database records.

Regardless, the deterministic nature of the obfuscation preserves the distributional characteristics of the information. To that point, the salary in row 660 and row 680 of table 600 are both "1500" when not obfuscated, but could be obfuscated to two entirely different values using a deterministic obfuscation function. For example, the salary in row 660 could be obfuscated to "abcd" and the salary in row 680 could be obfuscated to be "wxyz," despite the initial unobfuscated values being identical. Such an obfuscation function changes the data distribution so that the obfuscated values may no longer be useful when provided to a third party for debugging purposes, because the distributional properties and relationships present in the unobfuscated data do not exist in the obfuscated data. Further, if a text string in a query refers to a column in the schema, the name of the column will obfuscated differently in the query and in the schema. Thus, the relationship between these items is lost.

To preserve the distribution characteristics and relationships, deterministic one-to-one mappings may be used. FIG. 7 depicts mappings table 700 indicating one-to-one mappings between: (i) data making up the original entries as well as the schema elements (depicted in column 710), and (ii) the obfuscated entries (depicted in column 720). For example, column 710 could include "Chris A.", part of an entry from row 650 of table 600, and could include "Name," the name of column 620 in table 600. Each entry from column 710 could be associated with an obfuscated alphanumeric value in column 720. For example, "Chris A." is associated with "9370" and "Name" is associated with "col-2". Other elements of the schema to be used in potential database queries could also be included in mappings table 700, e.g., the name of the table. For example, table 600 may be named "employee" and mappings table 700 could include row 750 associating "employee" in column 710 with "B98C" in column 720.

These one-to-one mappings may not actually exist in table form and may instead represent associated inputs and outputs of the deterministic one-way function. Alternatively, some of these mappings may be pre-computed. Further, the obfuscated values shown have been selected in a shortened form for sake of convenience and example, and might not be representative of an actual output.

The deterministic one-way function could also include a method to verify that no two different input values are mapped to the same obfuscated output value, which may be helpful to ensure that the data distribution is preserved. Further, output for certain types of input may be generated in an orderly manner and not truly obfuscated. For example, in row 740, the columns of table 600 are mapped to generic column indicators, "col-2", "col-3", and "col-4", and so on.

D. Example Obfuscated Table and Database Entries

Figure 8:
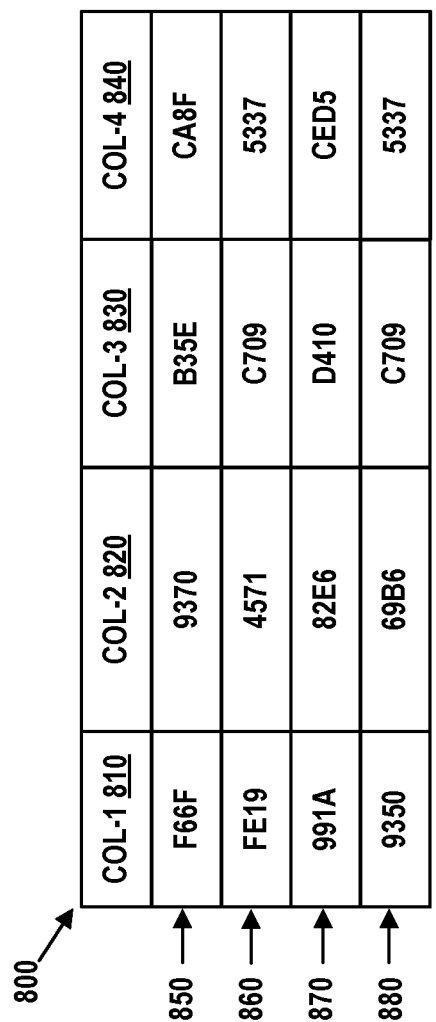
FIG. 8 depicts an obfuscated table, in accordance with example embodiments.

Using the results of a deterministic one-way function or mappings table 700, an obfuscated table may be generated from the original data entries. FIG. 8 depicts example obfuscated table 800, generated from unobfuscated table 600.

The data in obfuscated table 800 has the same or at least a similar distribution to entries in table 600. For example, in table 600, there are two entries with value "1500," 4 different column names, and 14 different entry values in total between rows 650, 660, 670, and 680. Similarly, in table 800, there are two entries with value "c709" (which corresponds to the value "1500", per table 700), 4 different column names, and 14 different entry values between rows 850, 860, 870, and 880. And as mentioned, each obfuscated record and schema element in table 800 (e.g., column names in column 810, column 820, column 830, and column 840, as well as entries in each column and/or row) can be associated with the original (unobfuscated) value through mappings table 700.

In some use cases, only part of table 600 may be taken into account for mappings table 700 and obfuscated table 800, particularly when table 600 is part of a large database and copying the entire database would be a computationally or memory intensive task. The partially obfuscated table 800 may be focused on portions of unobfuscated table 600 that are relevant to the solution and/or problem (e.g., one or more particular columns or rows) in order to maintain similar data distributions in relevant portions. Alternatively or additionally, the partially obfuscated table 800 may be randomly or pseudo-randomly sampled from unobfuscated table 600. In some cases, this may take place so that the distributions of the sampled unobfuscated table are roughly equivalent to the distributions in partially obfuscated table 800.

VI. Example Database Queries

Database tables, e.g., table 600, may be searched using database queries. Such queries may employ one or more of a variety of query languages, such as SQL. Using a similar process to the above outlined method (e.g., through the use of a one-way deterministic function such as mappings 700), queries may also be obfuscated to comply with privacy requirements, to hide sensitive information, or the like.

Figure 9:
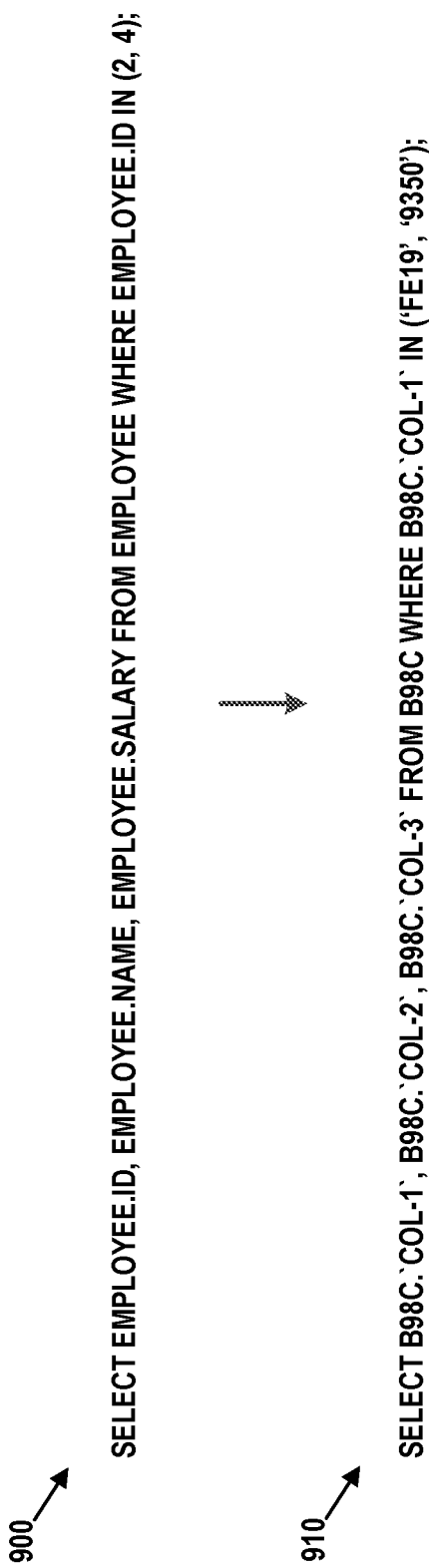
FIG. 9 depicts a query, in accordance with example embodiments.

FIG. 9 depicts unobfuscated query 900 and obfuscated query 910. Unobfuscated query 900 may have been used to retrieve entries from table 600 in a database. Obfuscated query 910 is an obfuscated version of unobfuscated query 900 and related to data in obfuscated table 800.

For example, unobfuscated query 900 selects the columns ID, name, and salary from the employee table (i.e., table 600), such that only entries where the ID is 2 or 4 are returned. In this example, unobfuscated query 900 is shown in a single line, which may be a stylistic choice and/or depend on the language in which the queries are written.

Unobfuscated query 900 may be transformed into obfuscated query 910 on a token by token basis, using a deterministic one-way function and/or a mapping table such as mapping table 700. For example, as depicted in obfuscated query 910 and mapping table 700, table 600 has been renamed from "employee" to "B98C". The ID column has been renamed to "col-1" the name column has been renamed to "col-2", and the salary column has been renamed to "col-3", and so on. And as depicted in mapping table 700, numbers "2" and "4" in the ID column correspond to "FE19" and "9350", respectively.

Queries 900 and 910 are examples and many other queries are possible, as well as many other possibilities of obfuscation. For example, in queries 900 and 910, the table name, "employee," was obfuscated, but table names may be exempt from obfuscation if doing so would not negatively affect security or performance, or for other reasons. Alternatively or additionally, other schema and/or database records may or may not be obfuscated.

Ultimately, queries 900 and 910 produce similar results. Query 900 may retrieve rows 660 and 680 from table 600, and query 910 may retrieve rows 860 and 880 from table 800, which, as discussed above, correspond to each other. Further, the distributions are preserved—both salary and address entries are similar in both tables, whereas the names and IDs are different. For example, in row 660 and 680 of table 600, the ID is 2 and 4 respectively, the names are "Joe B." and "Don T." respectively, and both salaries are 1500 and addresses are "165 Park St., Santa Clara, CA." In comparison, in row 860 and 880 of table 800, "col-1" (corresponding to "ID") are "FE19" and "9350" respectively, "col-2" (corresponding to "name") are "4571" and "69B6" respectively, "col-3" (corresponding to "salaries") are both "C709" and "col-4" (corresponding to addresses) are both "5337", respectively.

In an example implementation, a query, e.g., query 900, to an unobfuscated table in a database, e.g., table 600, may result in a database error or performance related problem. To resolve the database error or performance related problem, the computing device may then use a deterministic one-way function and/or mappings table 700, to produce an obfuscated table, e.g., obfuscated table 800 as well as obfuscated query 910. The obfuscated table and obfuscated query may then be safely provided to another party (e.g., the database developer), which may then use the obfuscated data and query to debug the issue.

VII. Example Architecture

Figure 10:
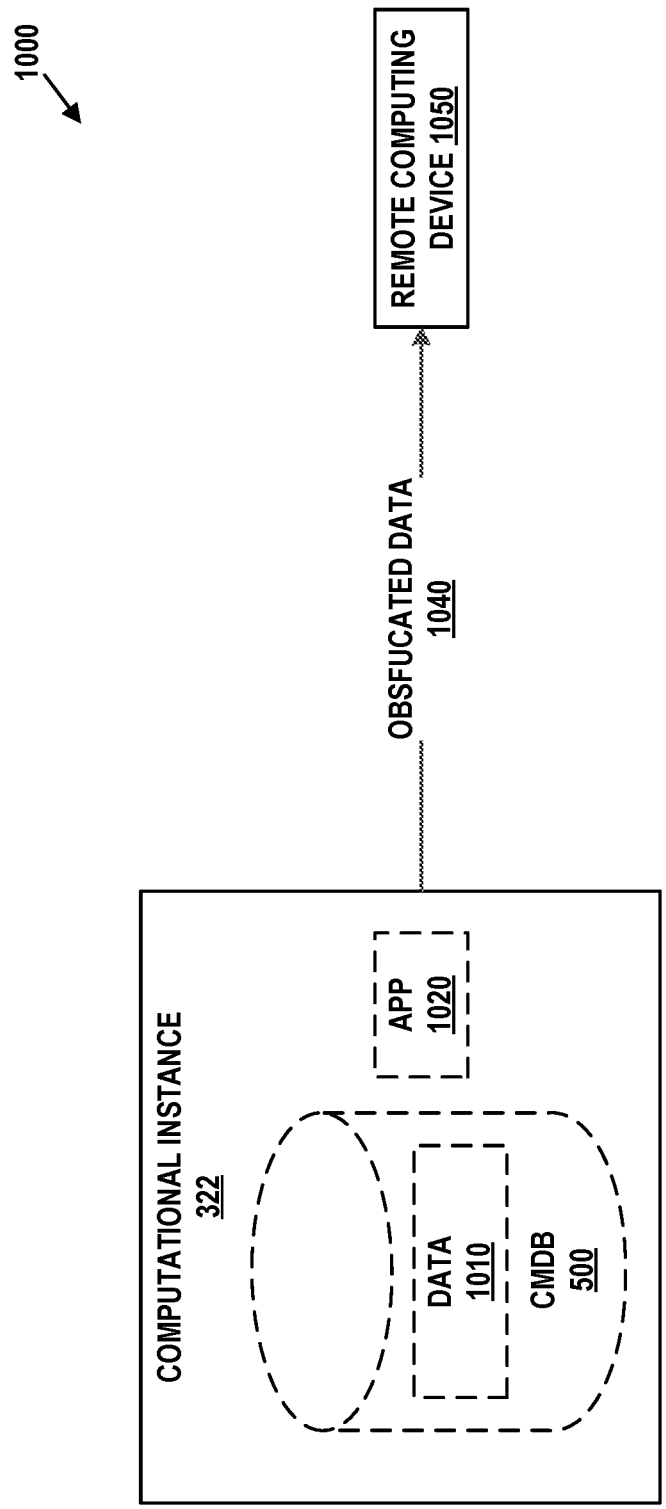
FIG. 10 depicts an architecture, in accordance with example embodiments.

FIG. 10 depicts example architecture 1000 through which the obfuscation methods described herein may be performed. Example architecture 1000 includes computational instance 322 and remote computing device 1050. Computational instance 322 may be used by an enterprise and the remote device 1050 may be used by a third party.

Computational instance 322 may include CMDB 500 and application 1020. CMDB 500 may include data 1010 comprising databases and tables therein arranged according to schemas. Application 1020 may contain a deterministic one-way function to obfuscate data 1010 (and any related queries). Specifically, in response to receiving a query, application 1020 may copy the data records and schema of data 1010 referenced by the query, in part or in whole, to a second table. Application 1020 may also obfuscate the query as well as the data records and schema of the second table.

The obfuscated data and query may be transmitted to a third party, e.g., remote computing device 1050, for debugging and other issue management purposes. Upon receiving the obfuscated data, the third party may perform relevant procedures for issue resolution. For example, it may be understood that the query should be returning multiple results but is instead only returning one result. The third party could then reproduce the issue, debug the obfuscated query with respect to the obfuscated table having the same data distribution as the original table, and resolve the issue without having access to any confidential information.

VIII. Example Operations

Figure 11:
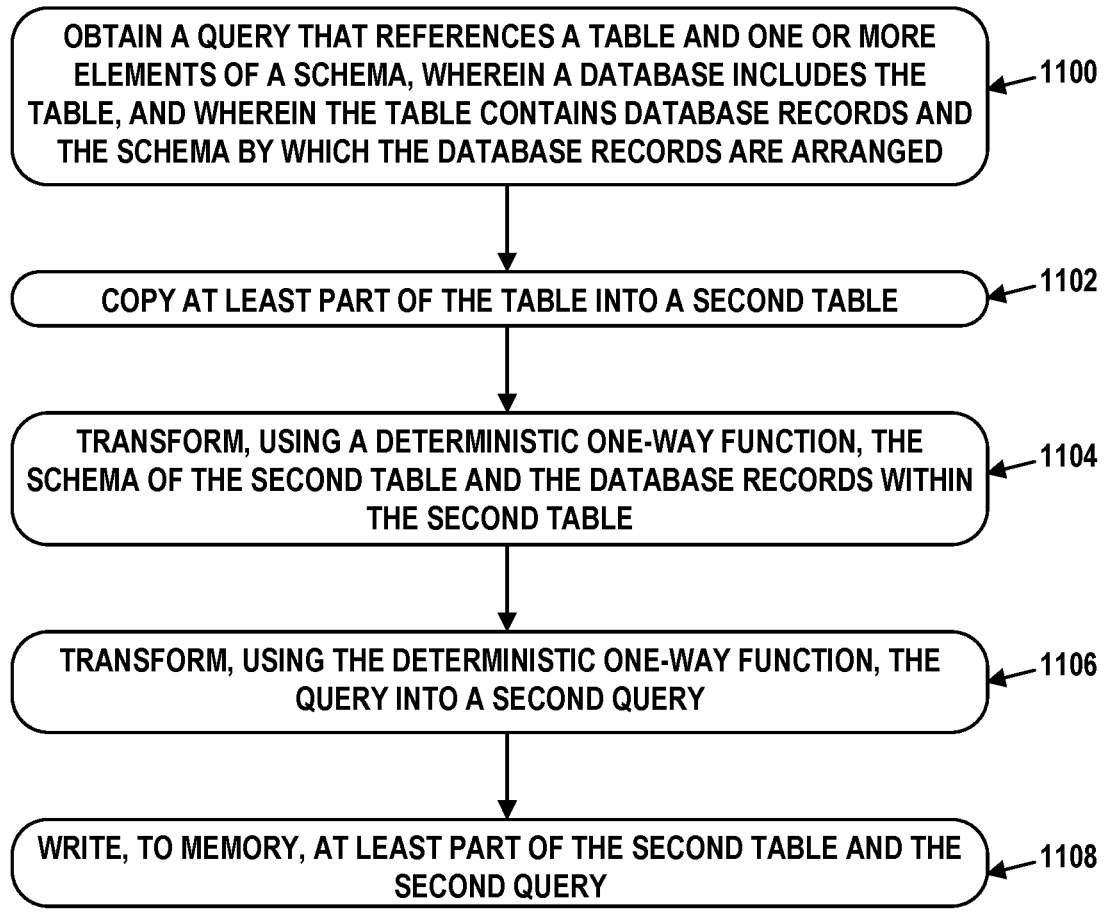
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 may involve obtaining a query that references a table and one or more elements of a schema, wherein a database includes the table, and wherein the table contains database records and the schema by which the database records are arranged.

Block 1102 may involve copying at least part of the table into a second table.

Block 1104 may involve transforming, using a deterministic one-way function, the schema of the second table and the database records within the second table.

Block 1106 may involve transforming, using the deterministic one-way function, the query into a second query.

Block 1108 may involve writing, to memory, at least part of the second table and the second query.

In some embodiments, the copying at least part of the table into the second table comprises copying some, but not all, of the database records from the table into the second table.

In some embodiments, the copying at least part of the table into the second table comprises copying some, but not all, of the schema from the table into the second table.

Some embodiments may involve transmitting, to a computing device, a representation of the second table and the second query.

In some embodiments, the system is a computational instance of a remote network management platform, and wherein the computing device is operated by a party that is separate and distinct from any party using or operating the computational instance.

In some embodiments, the query is related to a software application configured to execute on the system, and wherein the query caused the database or the software application to report an error or exhibit a performance-related problem.

In some embodiments, the database records, the schema, and the query contain original alphanumeric values, wherein the deterministic one-way function is configured to transform the original alphanumeric values into obfuscated versions of the original alphanumeric values, and wherein the obfuscated versions preserve both distributional characteristics of the original alphanumeric values and relationships between the database records, the schema, and the query.

In some embodiments, the database also includes a further table, wherein the further table contains further database records and a further schema by which the further database records are arranged, wherein the query also references the further table and one or more elements of the further schema, and the embodiment further includes copying at least part of the further table into a second further table, transforming, using the deterministic one-way function, the further schema of the second further table and the further database records within the second further table, and writing, to the memory, at least part of the second further table.

In some embodiments, the deterministic one-way function is configured to take alphanumeric text input and seed input, wherein the deterministic one-way function produces, for particular alphanumeric input text and a particular seed value, a particular alphanumeric output text.

In some embodiments, the schema of the second table, the database records within the second table, and the query each initially include respective sets of alphanumeric strings, wherein transforming the schema of the second table comprises independently transforming each of the alphanumeric strings within the schema of the second table, wherein transforming the database records of the second table comprises independently transforming each of the alphanumeric strings within the database records of the second table, and wherein transforming the query into a second query comprises independently transforming each of the alphanumeric strings within the query.

IX. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
obtaining a query that references a set of records disposed within memory of a computing system;
producing, by applying a first one-way function to the query, an obfuscated query, wherein the first one-way function is based on a first seed associated with a first random value;
producing, by applying a second one-way function to a subset of the set of records, an obfuscated set of records, wherein the second one-way function is based on a second seed associated with a second random value; and
writing, to the memory, a mapping between:
the obfuscated query based on the obtained query that references the set of records, wherein the obfuscated query is produced by the first one-way function, and
the obfuscated set of records based on the subset of the set of records, wherein the set of records is produced by the second one-way function.

2. The method of claim 1, wherein the first one-way function is the same as the second one-way function.

3. The method of claim 1, wherein the first one-way function produces, for an alphanumeric input text and the first seed value, a particular alphanumeric output text, and wherein the second one-way function produces, for the alphanumeric input text and the second seed value, the particular alphanumeric output text.

4. The method of claim 1, wherein the first one-way function produces the obfuscated query based on the query and the first seed value.

5. The method of claim 1, wherein the set of records are disposed within a table of a database, the database being stored in the memory, and wherein the query references the table, the method further comprising:
writing, to a second database table stored in the memory, the obfuscated query and the obfuscated set of records.

6. The method of claim 5, wherein the table is arranged according to a schema, and wherein the mapping is between the schema and an obfuscated version of the schema.

7. The method of claim 1, wherein the query is related to a software application, and wherein the query caused the software application to report an error a performance-related problem.

8. A non-transitory computer-readable medium, having stored thereon program instructions that, upon execution by a computing system, cause the computing system to perform operations comprising:
obtaining a query that references a set of records disposed within memory of the computing system;
producing, by applying a first one-way function to the query, an obfuscated query, wherein the first one-way function is based on a first seed associated with a first random value;
producing, by applying a second one-way function to a subset of the set of records, an obfuscated set of records, wherein the second one-way function is based on a second seed associated with a second random value; and
writing, to the memory, a mapping between:
the obfuscated query based on the obtained query that references the set of records, wherein the obfuscated query is produced by the first one-way function, and
the obfuscated set of records based on the subset of the set of records, wherein the set of records is produced by the second one-way function.

9. The non-transitory computer-readable medium of claim 8, wherein the first one-way function is the same as the second one-way function.

10. The non-transitory computer-readable medium of claim 8, wherein the first one-way function produces the obfuscated query based on the query and the first seed value.

11. The non-transitory computer-readable medium of claim 8, wherein the set of records are disposed within a table of a database, the database being stored in the memory, and wherein the query references the table, the operations further comprising:
writing, to a second database table stored in the memory, the obfuscated query and the obfuscated set of records.

12. The non-transitory computer-readable medium of claim 11, wherein the table is arranged according to a schema, and wherein the mapping is between the schema and an obfuscated version of the schema.

13. The non-transitory computer-readable medium of claim 8, wherein the query is related to a software application, and wherein the query caused the software application to report an error a performance-related problem.

14. A computing system comprising:
memory; and
one or more processors configured to execute program instructions that cause the computing system to perform operations comprising:
obtaining a query that references a set of records disposed within the memory;
producing, by applying a first one-way function to the query, an obfuscated query, wherein the first one-way function is based on a first seed associated with a first random value;
producing, by applying a second one-way function to a subset of the set of records, an obfuscated set of records, wherein the second one-way function is based on a second seed associated with a second random value; and
writing, to the memory, a mapping between:
the obfuscated query based on the obtained query that references the set of records, wherein the obfuscated query is produced by the first one-way function, and
the obfuscated set of records based on the subset of the set of records, wherein the set of records is produced by the second one-way function.

* * * * *